United States Patent
Oota et al.

(10) Patent No.: US 7,678,291 B2
(45) Date of Patent: Mar. 16, 2010

(54) SNOW-MELTING/ANTIFREEZING AGENTS

(75) Inventors: Teruo Oota, Kawagoe (JP); Hayato Asai, Kawagoe (JP); Takehiko Fukazawa, Kawagoe (JP)

(73) Assignee: ABC Research Laboratory for Building Materials Co., Ltd., Tokyo (JP)

(*) Notice: Subject to any disclaimer, the term of this patent is extended or adjusted under 35 U.S.C. 154(b) by 400 days.

(21) Appl. No.: 11/631,515

(22) PCT Filed: Jun. 30, 2005

(86) PCT No.: PCT/JP2005/012026

§ 371 (c)(1),
(2), (4) Date: Jan. 4, 2007

(87) PCT Pub. No.: WO2006/003966

PCT Pub. Date: Jan. 12, 2006

(65) Prior Publication Data

US 2008/0302997 A1  Dec. 11, 2008

(30) Foreign Application Priority Data

Jul. 5, 2004 (JP) .............................. 2004-197768

(51) Int. Cl.
*C09K 3/18* (2006.01)
(52) U.S. Cl. .......................................... 252/70; 106/13
(58) Field of Classification Search ................... 106/13; 252/70
See application file for complete search history.

(56) References Cited

U.S. PATENT DOCUMENTS

| 4,452,715 | A | * | 6/1984 | Hirozawa | ................. | 252/75 |
| 5,064,551 | A | * | 11/1991 | Smith | ................. | 252/70 |
| 5,350,533 | A | * | 9/1994 | Hubred et al. | ............. | 252/70 |
| 5,736,495 | A | * | 4/1998 | Bolkan et al. | ............. | 510/202 |
| 5,853,610 | A | * | 12/1998 | Kaes | ............. | 252/70 |

FOREIGN PATENT DOCUMENTS

| JP | 1 190783 | 7/1989 |
| JP | 2 222482 | 9/1990 |
| JP | 6 212147 | 8/1994 |
| JP | 8 506132 | 7/1996 |
| JP | 10 140130 | 5/1998 |
| JP | 10 251622 | 9/1998 |
| JP | 2000 104045 | 4/2000 |
| JP | 2002 362646 | 12/2002 |
| WO | WO02/081609 A2 * | 10/2002 |
| WO | WO02/090487 A1 * | 11/2002 |
| WO | WO03/076357 A1 * | 9/2003 |

* cited by examiner

*Primary Examiner*—Anthony J Green
(74) *Attorney, Agent, or Firm*—Oblon, Spivak, McClelland, Maier & Neustadt, L.L.P.

(57) ABSTRACT

A snow-melting/antifreezing agent which comprises potassium silicate as an active ingredient and a snow-melting/antifreezing agent which comprises potassium silicate and a nitrite salt as active ingredients are disclosed. These snow-melting/antifreezing agents may optionally further contain an alkali metal salt and/or a lower alcohol. These snow-melting/antifreezing agents are safe for the environment and do not cause concrete to deteriorate. They not only have excellent capability to melt snow and ice and to prevent freezing, but also have high profitability and are easy to handle.

16 Claims, No Drawings

SNOW-MELTING/ANTIFREEZING AGENTS

This application is a 371 of PCT/JP2005/012026 filed Jun. 30, 2005.

TECHNICAL FIELD

The present invention relates to a snow-melting/antifreezing agent and, more particularly, to a snow-melting/antifreezing agent used by being sprinkled onto the surface of an object such as a street, a parking lot, and the like in order to accelerate snow-melting and to prevent freezing. The snow-melting/antifreezing agent is safe for the environment and does not cause concrete to deteriorate.

BACKGROUND ART

Sodium chloride, calcium chloride, urea, and the like are widely used as a snow-melting agent or an antifreezing agent.

However, the snow-melting agent containing a chloride and the like has a problem of remarkably accelerating frost damage and deterioration of concrete by separating flaky materials from the surface. In addition, chloride ions permeate concrete, gradually spread into the core of the concrete and ultimately reach steel rods, and produce rust in the steel rods by the reaction with oxygen. Concrete finally produces cracks due to expansion.

On the other hand, protection of the earth environment has become a big issue in recent years. Although urea is free from the above-mentioned problems with chloride, urea has other problems such as reactions with metals, nutrient enrichment due to the nitrogen content, production of mold and moss, a bad odor after decomposition, and the like.

Therefore, notwithstanding the effect of melting snow and preventing freezing, conventional snow-melting agents are not necessarily satisfactory in respect of environmental protection, preventing deterioration of concrete, and the like.

Furthermore, since conventional snow-melting agents are generally available in the form of a powder, there has been a problem of handling during application.

DISCLOSURE OF THE INVENTION

Problems to be Solved by the Invention

The present invention has been achieved in view of these problems in the prior art and has an object of providing a snow-melting/antifreezing agent which is safe for the environment, does not cause concrete to deteriorate, excels in capability of melting snow and ice and preventing freezing, and is highly economical and easy to handle.

Means for Solving the Problems

A result of extensive studies in order to achieve the above object, the present inventors have found that potassium silicate or a mixture of potassium silicate and a nitrite salt excels in the effect of melting snow and ice, as well as the effect of preventing freezing. The inventors have further found that such an effect can be promoted if an alkali metal salt and/or a lower alcohol are added. These findings have led to the completion of the present invention.

Specifically, the present invention provides a snow-melting/antifreezing agent comprising potassium silicate as an active component.

The present invention further provides a snow-melting/antifreezing agent comprising potassium silicate and a nitrite salt as active components.

The present invention further provides a method for preventing freezing comprising previously spreading the snow-melting/antifreezing agent over the object surface or a method for melting snow or ice comprising spreading the snow-melting/antifreezing agent over a snow-covered surface or frozen surface.

EFFECT OF THE INVENTION

A snow-melting/antifreezing agent which is safe for the environment, does not cause concrete to deteriorate, excels in capability of melting snow and ice and preventing freezing, and is highly economical and easy to handle can be obtained according to the present invention.

That is, the snow-melting/antifreezing agent of the present invention not only has outstanding snow-melting and antifreeze effect, but also does not separate flakes from the surface of concrete and does not rust iron rods even if the agent permeate the concrete, because the agent does not contain a chloride. Furthermore, because the snow-melting/antifreezing agent of the present invention does not contain a component which brings about nutrient enrichment, the agent is free from a problem of generating of mold or moss. Moreover, since the snow-melting/antifreezing agent of the present invention can be made available in a liquid form, the agent can be easily spread as compared with a similar agent in the form of a powder.

DETAILED DESCRIPTION OF THE PREFERRED EMBODIMENT

In the present specification, a snow-melting/antifreezing agent refers to an agent used for the purpose of melting snow and preventing freezing. It has a function of not only melting snow or ice, but also preventing snow freezing by previous application.

One embodiment of the present invention (hereinafter referred to as "first invention") is a snow-melting/antifreezing agent comprising potassium silicate as an essential component. There are no specific limitations to the potassium silicate used in the first invention. Although commercially-available potassium silicate can be used, preferred potassium silicate is a compound shown by the following composition formula.

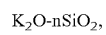

$K_2O\text{-}nSiO_2$, wherein n is a value from 1 to 5.

As preferable potassium silicate, a compound of the above composition formula in which n is from 1.8 to 3.7 can be given, with particularly preferable potassium silicate being a compound of the above composition formula in which n is from 1.8 to 2.2.

The potassium silicate is a commercially available compound. A product manufactured by Nippon Chemical Industrial Co., Ltd., for example, can be used.

Potassium silicate can also be prepared by a known method. In this instance, n in the above composition formula can be adjusted by a method known in the art, e.g. a method of adding an aqueous solution of potassium hydroxide to reduce n, for example.

The snow-melting/antifreezing agent of the first invention can be prepared in the form of a water solution or an aqueous solution (hereinafter referred to as "aqueous solution") by adding water to a concentrate of potassium silicate. Although not specifically limited, the content of potassium silicate in the aqueous solution is preferably about 1 to 56 mass % (hereinafter indicated as "%"), and particularly preferably 5 to 40% on a solid potassium silicate basis, when the snow-melting/antifreezing agent is sprinkled over the surface of the object. If the content is too small, the effect of melting snow or ice decreases and the effect of preventing freezing may be inferior.

Although the snow-melting/antifreezing agent of the first invention can exhibit its effect by only utilizing the effect of potassium silicate, the addition of an alkali metal salt is preferable in order to increase that effect. There are no specific limitations to the alkali metal salt used. As the cation of the alkali metal salt, a lithium ion, sodium ion, potassium ion, and the like are preferable. The potassium ion is particularly preferable in view of its capability of promoting antifreezing effect.

There are also no particular restrictions as to the anion of the alkali metal salt. A carbonate ion and an acetate ion are preferable due to the safety of the environment and the properties of not causing concrete to deteriorate. Moreover, taking the effect on the environment and concrete into consideration, the alkali metal salt not containing an element such as chlorine, phosphorus, and the like is particularly preferred. The alkali metal salt may be in the form of an anhydride or may be in a form containing crystal water.

Among the above-mentioned alkali metal salts, as specific examples of the alkali metal salt exhibiting a synergistic effect especially in respect of the snow-melting effect, ice-melting effect, and antifreeze effect by being used together with potassium silicate, potassium carbonate, potassium acetate, sodium acetate, and the like can be given. The use of these alkali metal salts is preferable also from the viewpoint of reducing the amount of expensive potassium silicate, while enjoying the advantage of the potassium silicate of being safe for the environment and not causing concrete to deteriorate.

Although there are no limitations to the amount of the alkali metal salt in the total amount of the snow-melting/antifreezing agent of the first invention, the amount of 1 to 40%, particularly 3 to 30%, on the anhydride basis excluding crystal water, is preferable. If greater than 40%, the alkali metal can be dissolved only with difficulty; if less than 1%, the effect of the combined use is reduced. It is also preferable that the alkali metal salt be used at a proportion of 2 to 4,000 parts by weight for 100 parts by weight of the potassium silicate on a solids basis. A particularly preferable proportion of the alkali metal salt used is 7.5 to 600 parts by weight for 100 parts by weight of the potassium silicate on a solids basis.

Moreover, the snow-melting and the antifreezing agent of the first invention may comprise a lower alcohol independently from the alkali metal salt or together with the alkali metal salt.

The lower alcohol here indicates an alcohol having 1 to 5 carbon atoms and may include monohydric alcohols and polyhydric alcohols. As specific examples of the lower alcohol, methanol, ethanol, n-propanol, isopropanol, n-butanol, ethylene glycol, diethylene glycol, triethylene glycol, glycerol, and the like can be given. Among these, preferable alcohols are ethanol, isopropanol, and the like, with ethanol being particularly preferable.

Although there are no limitations to the amount of the lower alcohol in the total amount of the snow-melting/antifreezing agent of the first invention, the amount of 1 to 15%, particularly 2 to 10% is preferable. If greater than 15%, the lower alcohol tends to be easily separated from potassium silicate solution; if less than 1%, the effect of the combined use is reduced. It is also preferable that the lower alcohol be used at a ratio of 2 to 1,500 parts by weight for 100 parts by weight of the potassium silicate on a solids basis, with a particularly preferable amount being from 5 to 200 parts by weight.

The combined use of the lower alcohol not only can synergistically increase the snow-melting or antifreezing effect of potassium silicate, but also can reduce the amount of expensive potassium silicate, while enjoying the advantage of the potassium silicate of being safe for the environment and not causing concrete to deteriorate.

As a particularly preferable embodiment of the snow-melting/antifreezing agent of the first invention, the use of both the alkali metal salt and the lower alcohol together with potassium silicate can be given. A preferable content of each component in the snow-melting/antifreezing agent in the case in which all of these three components are used (at the time of application) is as follows.

|  | Preferable range | Particularly preferable range |
| --- | --- | --- |
| Potassium silicate (solids basis) | 1 to 56% | 5 to 40% |
| Alkali metal salt (as anhydride) | 1 to 40% | 3 to 30% |
| Lower alcohol | 1 to 15% | 2 to 10% |

On the other hand, another embodiment ("second invention") of the present patent application relates to a snow-melting/antifreezing agent comprising potassium silicate and a nitrite salt as essential components. The potassium silicate used in the second invention is the same potassium silicate as mentioned above in the description of the first invention. The amount incorporated in the snow-melting/antifreezing agent of the second invention may also be the same as the amount described above.

As examples of the nitrite salt used in the snow-melting/antifreezing agent of the second invention, sodium nitrite, calcium nitrite, and the like can be given, with a preferable nitrite salt being sodium nitrite.

Although there are no particular limitations to the amount of the nitrite salt in the total amount of the snow-melting/antifreezing agent of the second invention, the amount of 1 to 40%, and particularly 3 to 30%, is preferable. If greater than 40%, it is difficult to dissolve the nitrite salt; if less than 1%, the effect of combined use is reduced. The amount of nitrite salt used is preferably in a range of 2 to 4,000 parts by weight, and particularly preferably 7.5 to 600 parts by weight, for 100 parts by weight the potassium silicate on the solids basis.

The use of a nitrite salt in combination with potassium silicate in the second invention increases the effect of the potassium silicate to suppress or prevent deterioration of concrete, while ensuring the snow-melting and antifreezing effect of the potassium silicate.

As in the case of the first invention, the addition of an alkali metal salt (excluding a nitrite salt) is desirable in order to increase the effect of the snow-melting/antifreezing agent of the second invention. The same alkali metal salts (excluding nitrite salts) as mentioned in the description of the first invention can be given as the alkali metal salts used in the second invention.

In addition, in the same way as in the first invention, the snow-melting/antifreezing agent of the second invention may comprise a lower alcohol independently from the alkali metal salt or together with the alkali metal salt. The same lower alcohols as mentioned in the first invention can also be used in the second invention.

As a particularly preferable embodiment of the snow-melting/antifreezing agent of the second invention described above, the combined use of potassium silicate, a nitrite salt, and alkali metal salt (excluding nitrite salts) can be given. A preferable content of each component in the snow-melting/antifreezing agent in the case in which all of these three components are used (at the time of application) is as follows.

|  | Preferable range | Particularly preferable range |
|---|---|---|
| Potassium silicate (solids basis) | 1 to 56% | 5 to 40% |
| Nitrite salt | 1 to 40% | 3 to 30% |
| Alkali metal salt (as anhydride) | 1 to 40% | 3 to 30% |

The snow-melting/antifreezing agent of the first and second inventions obtained as described above can be used, for example, in the form of liquid by dispersing the liquid over the surface of the object using a liquid disperser. There are no specific limitations to the liquid disperser used here. Commercially available sprayers, sprinklers, and the like can be given as examples.

There are no particular limitations to the object surface over which the snow-melting/antifreezing agent of the present invention is dispersed. A paved or unpaved road, parking lot, runway and apron of an airport, farmland, golf course, and the like can be given as examples. Of these, from the viewpoint of effectively preventing vehicle slip accidents, roads and parking lots are most preferable objects to which the snow-melting/antifreezing agent of the present invention can be most advantageously applied. The snow-melting/antifreezing agent of the present invention may be sprinkled either onto the piled-up snow surface or frozen surface, or may be sprinkled beforehand onto the unfrozen surfaces in order to prevent such surfaces from freezing.

EXAMPLES

The present invention will be described in more detail by way of Examples which should not be construed as limiting the present invention.

Example 1

200 g of each of the aqueous solutions listed in Table 1 was put into a beaker having a diameter of 70 mm at the bottom, and allowed to stand at −10° C. for 24 hours to observe antifreezing performance. The performance was evaluated according to the following standard. The experiment was carried out at a frozen surface temperature of −10° C. to −7° C., a temperature range at which the surface is generally most slippery. The results are shown in Tables 1 and 2.

The following silicates were used for the experiment.

Lithium silicate: $Li_2O \cdot n'SiO_2$ (n': 3.4 to 3.6) manufactured by Nippon Chemical Industrial Co., Ltd.

Sodium silicate: $Na_2O \cdot n''SiO_2$ (n'': 3.0 to 3.3) manufactured by Nippon Chemical Industrial Co. Ltd.

Potassium silicate: $K_2O \cdot nSiO_2$ (n: 1.8 to 2.2) manufactured by Nippon Chemical Industrial Co., Ltd.

In the Tables, the silicate content is indicated on a solids basis and the content of alkali metal salt is indicated on an anhydride basis.

<Evaluation Standard of Antifreezing Performance>

| (Evaluation) | (State of sample agents) |
|---|---|
| ○ | Liquid |
| ○Δ | Almost liquid, but includes some solid portions |
| Δ | Semi-liquid or semi-solid state |
| ΔX | Almost solid, but includes some liquid portions (something like sherbet) |
| X | Solid |

TABLE 1

| Aqueous solution No. | Silicate | | Alkali metal salt | | Lower alcohol | | Antifreezing performance | Remarks |
|---|---|---|---|---|---|---|---|---|
| 1 | Lithium silicate | 26% | — | | — | | X | |
| 2 | Sodium silicate | 26% | — | | — | | X | |
| 3 | Potassium silicate | 26% | — | | — | | ΔX | |
| 4 | Lithium silicate | 44% | — | | — | | N.A. | Gelled at room temp. |
| 5 | Sodium silicate | 44% | — | | — | | X | |
| 6 | Potassium silicate | 44% | — | | — | | ○ | |
| 7 | Potassium silicate | 5% | Potassium carbonate | 20% | — | | ○ | |
| 8 | Potassium silicate | 5% | Potassium acetate | 15% | — | | ○ | |
| 9 | Potassium silicate | 5% | — | | Ethanol | 10% | ○ | |
| 10 | Potassium silicate | 5% | Potassium carbonate | 15% | Ethanol | 6% | ○ | |
| 11 | Potassium silicate | 5% | Potassium acetate | 10% | Ethanol | 6% | ○ | |
| 12 | Potassium silicate | 10% | Potassium carbonate | 20% | — | | ○ | |
| 13 | Potassium silicate | 10% | Potassium acetate | 15% | — | | ○ | |
| 14 | Potassium silicate | 10% | — | | Ethanol | 5% | ○ | |
| 15 | Potassium silicate | 10% | Potassium carbonate | 15% | Ethanol | 4% | ○ | |
| 16 | Potassium silicate | 10% | Potassium acetate | 10% | Ethanol | 4% | ○ | |
| 17 | Potassium silicate | 20% | Potassium carbonate | 15% | — | | ○ | |
| 18 | Potassium silicate | 20% | Potassium acetate | 10% | — | | ○ | |
| 19 | Potassium silicate | 20% | — | | Ethanol | 3% | ○ | |
| 20 | Potassium silicate | 20% | Potassium carbonate | 10% | Ethanol | 2% | ○ | |
| 21 | Potassium silicate | 20% | Potassium acetate | 5% | Ethanol | 2% | ○ | |
| 22 | Potassium silicate | 40% | Potassium carbonate | 3% | — | | ○ | |
| 23 | Potassium silicate | 40% | Potassium acetate | 1% | — | | ○ | |
| 24 | Potassium silicate | 40% | — | | Ethanol | 1% | ○ | |

TABLE 2

| Aqueous solution No. | Composition of Aqueous solutions | | | | Antifreezing performance | Remarks |
| --- | --- | --- | --- | --- | --- | --- |
| | Silicate | Alkali metal salt | | Lower alcohol | | |
| 25 | — | Potassium carbonate | 10% | — | ΔX | |
| 26 | — | Potassium carbonate | 15% | — | Δ | |
| 27 | — | Potassium carbonate | 20% | — | ○Δ | |
| 28 | — | Potassium carbonate | 25% | — | ○ | |
| 29 | — | Sodium carbonate | 10% | — | X | |
| 30 | — | Sodium carbonate | 15% | — | X | |
| 31 | — | Sodium carbonate | 20% | — | X | |
| 32 | — | Sodium carbonate | 25% | — | X | |
| 33 | — | Potassium acetate | 10% | — | ΔX | |
| 34 | — | Potassium acetate | 15% | — | ○Δ | |
| 35 | — | Potassium acetate | 20% | — | ○ | |
| 36 | — | Potassium acetate | 25% | — | ○ | |
| 37 | — | Sodium acetate | 10% | — | X | |
| 38 | — | Sodium acetate | 15% | — | Δ | |
| 39 | — | Sodium acetate | 20% | — | ○Δ | |
| 40 | — | Sodium acetate | 25% | — | ○ | |
| 41 | — | — | | Ethanol 5% | X | |
| 42 | — | — | | Ethanol 10% | ΔX | |
| 43 | — | — | | Isopropanol 5% | X | |
| 44 | — | — | | Isopropanol 10% | ΔX | |
| 45 | — | — | | n-Butanol 5% | X | |
| 46 | — | — | | n-Butanol 10% | N.A. | Separated from water |

As can be understood from the results of aqueous solutions No. 1 to No. 6 in Table 1, potassium silicate was more excellent than lithium silicate and sodium silicate in the antifreezing properties. Because the lithium silicate gels, a high concentration aqueous solution of lithium silicate could not be obtained. Potassium silicate was confirmed to exhibit better antifreezing performance as the concentration increases.

As can be seen from comparison of the results of the aqueous solution No. 3 and the aqueous solutions Nos. 7 to 21 in Table 1, the antifreezing performance of 26% potassium silicate of the aqueous solution No. 3 could be improved by the combined use of potassium carbonate, potassium acetate, and/or ethanol.

As can be understood from the results of aqueous solutions No. 25 to No. 40 in Table 2, in which an alkali metal salt was used alone, potassium carbonate, sodium acetate, and potassium acetate were confirmed to exhibit excellent antifreezing performance. These results confirmed that potassium carbonate, sodium acetate, and potassium acetate are desirable alkali metal salts to be used together with potassium silicate. An antifreezing effect may be exhibited by using an alkali metal salt alone, if the alkali metal salt is used at a concentration of 20% or more. However, since an alkali metal salt cannot prevent or suppress deterioration of concrete, an alkali metal salt cannot be used alone for the purpose of achieving the object of the present invention.

Considering the results of the experiments using the aqueous solutions No. 41 to No. 46 in Table 2 in which lower alcohols were independently used and the results that 5% isopropanol, 10% isopropanol, or 5% n-butanol were not separated from water when potassium silicate was not present in the aqueous solutions (No. 43 to No. 45), but easily separated from water when potassium silicate was present, ethanol is the best lower alcohol to be used in combination with potassium silicate.

Example 2

200 g of water was put into a cylindrical plastic container, having a diameter of 70 mm at the bottom, and allowed to become frozen in a thermostatic vessel at −10° C. The total weight ($m_0$) was measured. 40 g of a potassium silicate aqueous solution (containing 56% of potassium silicate on a sold basis, indicated as "aqueous solution No. 47") was poured over the resulting ice surface and allowed to stand at −10° C. for one hour.

The weight was measured again after removing the liquid (including melted water) from the ice surface by decantation and further completely removing the liquid on the surface using a filter paper to determine the weight loss by subtracting the resultant weight from $m_0$. The weight loss was regarded as the amount of melted ice. The amount of the melted ice after having been allowed to stand for 24 hours at −10° C. was also determined in the same manner.

The amounts of melted ice after one hour and 24 hours were determined in the same manner as in the cases in which aqueous solutions No. 7 to No. 24 in Table 1 were used. The results are shown in Table 3.

TABLE 3

| Aqueous solution No. | Amount of melted ice (g) | |
| --- | --- | --- |
| | After one hour | After 24 hours |
| 47 | 19.08 | 23.91 |
| 7 | 15.80 | 20.00 |
| 8 | 16.26 | 21.35 |
| 9 | 10.02 | 11.63 |
| 10 | 17.55 | 26.18 |
| 11 | 13.83 | 19.38 |
| 12 | 15.81 | 23.07 |
| 13 | 17.23 | 21.94 |
| 14 | 11.03 | 13.37 |
| 15 | 20.54 | 24.45 |
| 16 | 15.50 | 19.68 |

TABLE 3-continued

| Aqueous solution | Amount of melted ice (g) | |
|---|---|---|
| No. | After one hour | After 24 hours |
| 17 | 19.33 | 48.04 |
| 18 | 20.62 | 49.12 |
| 19 | 9.91 | 24.78 |
| 20 | 16.57 | 21.40 |
| 21 | 10.22 | 13.45 |
| 22 | 14.00 | 31.19 |
| 23 | 22.99 | 31.66 |
| 24 | 17.34 | 28.37 |

It can be seen from Table 3 that the aqueous solution No. 47 and the aqueous solutions No. 7 to No. 24 melted a sufficient amount of ice. It was thus confirmed that these aqueous solutions show an excellent snow-melting effect when sprinkled over a road, for example. Moreover, it was confirmed that not only the amount of melted ice after one hour, but also the amount of melting ice after 24 hours was sufficiently great, demonstrating the persistent effect of the snow-melting/antifreezing agent of the present invention.

Example 3

The antifreezing effect was evaluated in the same manner as in Example 1, except for using aqueous solutions shown in Table 4 instead of using the aqueous solutions shown in Table 1. The results are shown in Table 4.

TABLE 4

| Aqueous solution No. | Aqueous solution composition | | | | | Antifreezing properties |
|---|---|---|---|---|---|---|
| | Silicate | Alkali metal salt | | Nitrite salt | | |
| 48 | Potassium silicate | 5% Potassium carbonate | 20% | — | | ◯ |
| 49 | Potassium silicate | 5% Potassium carbonate | 15% | Sodium nitrite | 5% | ◯ |
| 50 | Potassium silicate | 5% Potassium carbonate | 10% | Sodium nitrite | 10% | ◯ |
| 51 | Potassium silicate | 5% Potassium acetate | 15% | — | | ◯ |
| 52 | Potassium silicate | 5% Potassium acetate | 11.25% | Sodium nitrite | 3.75% | ◯ |
| 53 | Potassium silicate | 5% Potassium acetate | 7.5% | Sodium nitrite | 7.5% | ◯ |

As can be seen from Table 4, the aqueous solutions No. 48 to No. 53 showed an excellent antifreezing effect, confirming that the antifreezing effect can be maintained in the case in which a nitrite salt is further added to a composition solution of potassium silicate and an alkali metal salt.

Example 4

The amount of melted ice was determined in the same manner as in Example 2, except for using aqueous solutions shown in Table 4 instead of using the aqueous solutions shown in Table 1. The results are shown in Table 5.

TABLE 5

| Aqueous solution | Amount of melted ice (g) | |
|---|---|---|
| No. | After one hour | After 24 hours |
| 48 | 12.05 | 15.86 |
| 49 | 11.99 | 15.56 |
| 50 | 12.73 | 17.11 |
| 51 | 13.00 | 16.32 |
| 52 | 12.93 | 16.02 |
| 53 | 13.16 | 17.07 |

As can be seen from Table 5, the aqueous solutions No. 48 to No. 53 melted a sufficient amount of ice. The amount of melted ice was sufficiently great not only after one hour, but also after 24 hours, showing that the addition of a nitrate to an aqueous solution of potassium silicate and an alkali metal salt can maintain an excellent ice-melting effect.

Example 5

(1) A 34.2% aqueous solution of sodium chloride was prepared. Comparative aqueous solutions consisting of the sodium chloride aqueous solution and water at a ratio of 10:0, 8:2, 6:4, 4:6, or 2:8 were prepared by adding water to this sodium chloride aqueous solution. Test aqueous solutions were prepared from the aqueous solutions No. 48 to No. 53 of Example 3 and the above aqueous solution of sodium chloride by mixing the aqueous solutions No. 48 to No. 53 with the above aqueous solution of sodium chloride at a ratio of 10:0, 8:2, 6:4, 4:6, or 2:8.

(2) A steel rod (SR19) was cut to a length of 10 cm to prepare a sample. After measuring the initial weight, the sample was placed in a 300 ml polypropylene container, and 150 ml of either the comparative aqueous solution or the test aqueous solution prepared in (1) was added to immerse the sample in the solution.

(3) The sample was removed from the aqueous solution on the seventh day of immersion. After completely removing water, the weight was measured to determine the weight difference from the initial weight. The type and amount of rust produced was observed by naked eye inspection. In addition, a corroded area was measured to determine the corrosion rate (%) using the following formula. The results are shown in Table 6.

Corrosion rate (%)=100×corroded area (cm$^2$)/immersed area (cm$^2$)

TABLE 6

|  | Aqueous solution No. |  | Mixing ratio *1 | | | | |
|---|---|---|---|---|---|---|---|
|  |  |  | 10:0 | 8:2 | 6:4 | 4:6 | 2:8 |
| Comparative aqueous solution | 34.2‰ NaCl aqueous solution | Weight change *2 | −0.04 | −0.03 | −0.05 | −0.05 | −0.03 |
|  |  | Corrosion rate *3 | 19.0 | 15.4 | 21.1 | 20.7 | 25.3 |
|  |  | Appearance | Black rust | Black rust | Black rust | Black rust | Thin black rust |
| Test aqueous solutions | 48 | Weight change | 0 | 0 | 0 | 0 | 0 |
|  |  | Corrosion rate | 0 | 0 | 1.0 | 2.2 | 1.6 |
|  |  | Appearance | No change | No change | Slight red rust | Slight red rust | Slight red rust |
|  | 49 | Weight change | 0 | 0 | 0 | 0 | 0 |
|  |  | Corrosion rate | 0 | 0 | 0 | 0 | 4.4 |
|  |  | Appearance | No change | No change | No change | No change | Slight red rust |
|  | 50 | Weight change | 0 | 0 | 0 | 0 | 0 |
|  |  | Corrosion rate | 0 | 0 | 0 | 0 | 4.9 |
|  |  | Appearance | No change | No change | No change | No change | Slight red rust |
|  | 51 | Weight change | 0 | 0 | 0 | −0.02 | −0.02 |
|  |  | Corrosion rate | 0 | 0 | 2.6 | 7.4 | 6.5 |
|  |  | Appearance | No change | No change | Slight red rust | Red rust | Red rust |
|  | 52 | Weight change | 0 | 0 | 0 | 0 | 0 |
|  |  | Corrosion rate | 0 | 0 | 0 | 0.9 | 1.3 |
|  |  | Appearance | No change | No change | No change | Slight red rust | Slight red rust |
|  | 53 | Weight change | 0 | 0 | 0 | 0 | 0 |
|  |  | Corrosion rate | 0 | 0 | 0 | 0 | 5.3 |
|  |  | Appearance | No change | No change | No change | No change | Red rust |

*1 The mixing ratio of the comparative aqueous solution indicates the ratio of 34.2‰ NaCl aqueous solution and water. The mixing ratio of the test aqueous solutions indicates the ratio of each of the aqueous solutions of No. 48 to 53 and 34.2‰ NaCl aqueous solution.
*2 The weight change indicates a value obtained by subtracting the initial weight (g) from the weight (g) after seven days.
*3 The unit of corrosion rate is %.

It can be seen from Table 6 that the test aqueous solutions prepared from the aqueous solutions No. 48 to No. 53 showed the effect of preventing the steel rod from being corroded with chloride ions. Moreover, it was shown that the excellent corrosion preventing effect of a composition comprising potassium silicate and an alkali metal salt can be promoted by the combined use of a nitrite salt.

INDUSTRIAL APPLICABILITY

The snow-melting/antifreezing agent of the present invention is safe for the environment, does not cause concrete to deteriorate, and exhibits excellent capability of melting snow and ice and preventing freezing. In addition, since the snow-melting/antifreezing agent is highly economical and can be made available in the form of a liquid that provides ease of handling, it can be widely used on paved or unpaved roads, parking lots, runways and aprons of airports, farmlands, golf courses, and the like.

The snow-melting/antifreezing agent of the present invention can exhibit its advantageous features particularly when applied to a concrete surface, because the snow-melting/antifreezing agent does not remove flakes from the surface of concrete and does not corrode iron rods.

The invention claimed is:

1. A method for preventing freezing on a surface in need thereof or for melting at least one of snow and ice, comprising:
spreading on said surface, on said at least one of snow and ice, or on both said surface and on said at least one of snow and ice an aqueous solution comprising water, 1 to 56 mass % potassium silicate and 1 to 40 mass % potassium carbonate, wherein said aqueous solution comprises substantially no chloride.

2. The method according to claim 1, wherein the potassium silicate is represented by the formula $K_2O_n SiO_2$, wherein n is a value from 1 to 5.

3. The method according to claim 2, wherein n is a value from 1.8 to 3.7.

4. The method according to claim 2, wherein n is a value from 1.8 to 2.2.

5. The method according to claim 1, wherein the aqueous solution further comprises a lower alcohol.

6. The method according to claim 5, wherein the lower alcohol is ethanol.

7. The method according to claim 1, wherein the aqueous solution comprises 5 to 40 mass % potassium silicate and 3 to 30 mass % potassium carbonate.

8. The method according to claim 1, wherein the aqueous solution further comprises a nitrate salt.

9. The method according to claim 8, wherein the nitrite salt is sodium nitrite.

10. The method according to claim 1, wherein the aqueous solution further comprises a nitrite salt and a lower alcohol.

11. The method according to claim 10, wherein the nitrite salt is sodium nitrite and the lower alcohol is ethanol.

12. The method according to claim 1, wherein the aqueous solution is spread using a sprayer.

13. The method according to claim 1, wherein the surface is a road, a parking lot, a runway, or an apron.

14. The method according to claim 1, which is a method for preventing freezing on a surface comprising spreading said aqueous solution on said surface.

15. The method according to claim 1, which is a method for melting snow, comprising spreading said aqueous solution on said snow.

16. The method according to claim 1, which is a method for melting ice, comprising spreading said aqueous solution on said ice.

* * * * *